United States Patent

Steinlechner

[11] Patent Number: 6,147,763
[45] Date of Patent: Nov. 14, 2000

[54] CIRCUITRY FOR PROCESSING SIGNALS OCCURRING IN A HETERODYNE INTERFEROMETER

[75] Inventor: Siegbert Steinlechner, Leonberg, Germany

[73] Assignee: Robert Bosch GmbH, Stuttgart, Germany

[21] Appl. No.: 09/380,229

[22] PCT Filed: Feb. 20, 1998

[86] PCT No.: PCT/DE98/00425

§ 371 Date: Dec. 27, 1999

§ 102(e) Date: Dec. 27, 1999

[87] PCT Pub. No.: WO98/38474

PCT Pub. Date: Sep. 3, 1998

[30] Foreign Application Priority Data

Feb. 28, 1997 [DE] Germany .......................... 197 08 163

[51] Int. Cl.[7] .................................................. G01B 9/02
[52] U.S. Cl. ........................ 356/484; 356/450; 356/349
[58] Field of Search .................................... 356/349, 345

[56] References Cited

U.S. PATENT DOCUMENTS 4,594,000   6/1986  Falk .
5,293,215   3/1994  Pfendler et al. .
5,402,230   3/1995  Tian et al. ............................... 356/349

FOREIGN PATENT DOCUMENTS 0 729 583   9/1996  European Pat. Off. .
WO 90/10195 9/1990  WIPO .

Primary Examiner—Frank G. Font
Assistant Examiner—Philip Natividad
Attorney, Agent, or Firm—Kenyon & Kenyon

[57] ABSTRACT

A signal processing circuit for a reference signal occurring in a heterodyne interferometer and a measured signal. The underlying frequency modulation of the radiation source of the heterodyne interferometer results in phase jumps in both signals. Signal filtering of both the reference signal and the measured signal with a gate signal removes from both signals those signal components that have the same phase sign. Further simplification of the signal processing results from signal interpolation by band pass filters and signal down-mixing into a lower frequency range below the heterodyne frequency. The input signals processed by the circuit can be further processed by a conventional phase comparator.

10 Claims, 4 Drawing Sheets

CIRCUITRY FOR PROCESSING SIGNALS OCCURRING IN A HETERODYNE INTERFEROMETER

FIELD OF THE INVENTION

The present invention relates to a signal processing circuit for reference and measured signals occurring in a heterodyne interferometer according to the definition of the species of the independent claim. Heterodyne interferometry is used, for example, for contactless distance, angle, or velocity measurements. An optical measuring beam is directed onto grid structures or mirrors placed on the measured object. The surface of the measured object may occasionally even serve as a diffraction grid or a reflector.

BACKGROUND INFORMATION

European Patent Application No. 0 461 119 (corresponding to International Patent Publication No. WO 09/10195) describes a heterodyne interferometer in which a laser diode is used as the radiation source. The injection current of the laser diode is periodically modulated using a saw tooth or triangular modulation signal, for example. Injection current modulation results in periodic changes in the frequency of the optical beam produced by the laser diode, which is split by a beam splitter into two beam paths. The optical measured route is in the first beam path, and an optical monostable element is provided in the other beam path. Due to the periodic modulation, a frequency difference, corresponding to the heterodyne frequency, always appears between the two beam paths. The two partial beams are brought to a beam receiver for interference after traveling through the measured route. The measured signal generated at the beam receiver has a sinusoidal signal shape. The frequency of the measured signal is equal to the heterodyne frequency. The information about distance, angle or velocity is contained in the phase angle of the measured signal with respect to a reference signal. The reference signal can also be made available optically in an optical reference route. In this case, the two partial beams are brought to an additional beam receiver for interference after traveling through the optical reference route. The optical reference route may be omitted if the reference signal is derived electrically from the modulation signal of the laser diode.

European Patent Application No. 0 729 583 describes a device for measuring the phase difference between two electric signals occurring in a heterodyne interferometer. Each predefined edge of a first signal and each predefined edge of a second signal trigger counting sequences that allow the determination of the phase difference from multiples of 360° and high-resolution measurement of the angle from 0° to 360°. No instructions are given regarding the pre-processing of the signals sent to the known device.

The object of the present invention is to provide a circuit for pre-processing signals occurring in a heterodyne interferometer.

SUMMARY OF THE INVENTION

The circuit according to the present invention has the advantage that a periodically occurring sign change between a reference and a measured signal does not affect the determination of the phase difference. Such a periodically occurring sign change arises due to the modulation of the radiation source with the predefined modulation signal. A phase jump occurs if the sign of the slope of the frequency variation changes.

The circuit according to the present invention assures that the reference signal and the measured signal, between which the phase difference to be measured occurs, have the same heterodyne frequency and that the heterodyne frequency is defined as an integer multiple of the modulation frequency of the radiation source. This can be achieved by suitably dimensioning an optical monostable element or by appropriately defining the amplitude of the modulation signal.

A gate signal, whose period corresponds to the modulation period, is derived from the modulation signal. Using the gate signal, the reference signal is filtered by multiplication so that those signal components of the reference signal having the same phase sign are forwarded. The measured signal is also filtered by multiplication using the gate signal so that only those measured signal components having the same sign are forwarded. The gate signal filtered signals can be sent to a phase comparator known from the related art, which determines the phase difference, from which the result can be derived.

Further signal processing is simplified when the gate signal filtered signals are each sent to one of the band pass filters tuned to the heterodyne frequency. The band passes reconvert the unsteady gate signal filtered signals into continuous signals, which can be further processed in a simple manner using analog circuit technology.

The gate signal filtered or band pass filtered signals are each preferably sent to a mixer, which allows the signal frequency to be reduced in order to allow even simpler further signal processing.

The gate signal or band pass filtered or down-mixed signals are preferably subjected to low-pass filtering. Low-pass filtering eliminates undesirable signal components, which may appear in the mixer, for example, and further reduces the noise signal components that may affect the signals.

Further signal processing is simplified if the signals are sent to a comparator, so that the signals are available as digital signals, which can be processed by a digital phase comparator.

A laser diode allowing simple modulation of the optical beam through modulation of the injection current is preferably provided as the radiation source in the heterodyne interferometer. A network allows non-linearities to be compensated and thermal time constants to be taken into account in the laser diode. The network allows the laser diode injection current to be influenced so that the heterodyne frequency is constant over a longer period. With these measures, the time window determined by the gate signal can be brought closer to the theoretically maximum value, which is equal to 50% of the modulation period.

In an advantageous embodiment of the present invention, the reference signal is derived from the modulation signal. With this measure, the optical reference route and an additional beam receiver, which would be otherwise required, are no longer necessary.

DETAILED DESCRIPTION

Figure 1:
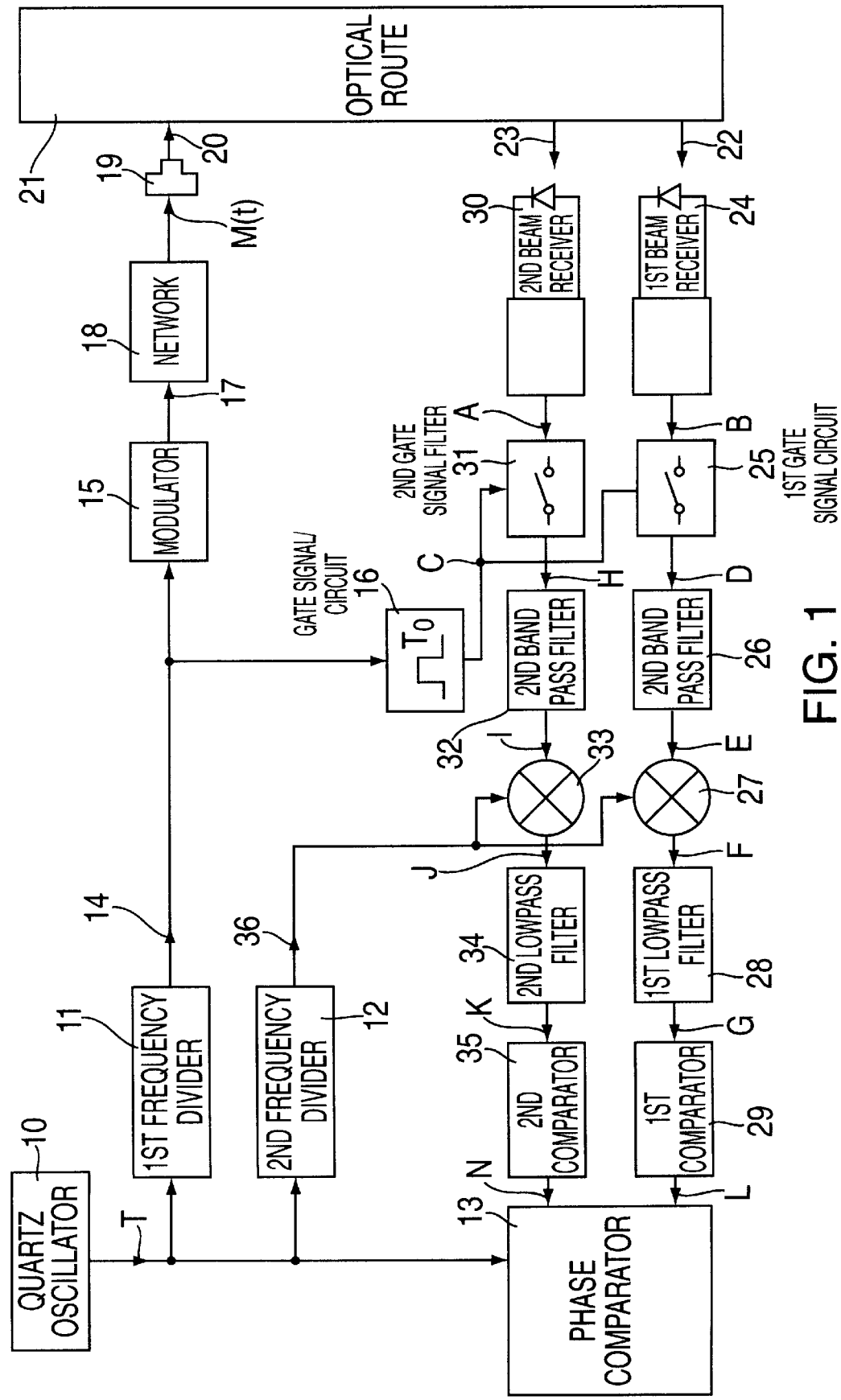
FIG. 1 shows a block diagram of a circuit according to the present invention.

FIG. 1 shows a block diagram of a signal processing circuit for a reference signal A occurring in a heterodyne interferometer and a measured signal B. A clock signal T generated by a quartz oscillator 10 is sent to a first frequency divider 11, a second frequency divider 12, and a phase comparator 13. An output signal 14 of first frequency divider 11 is sent to a modulator 15 and a gate signal circuit 16. An output signal 17 of modulator 15 goes to a laser diode 19 as a modulation signal M(t) after passing through a network 18.

The laser diode 19 emits an optical beam 20 to an optical route 21 which generates a measured beam 22 and a reference beam 23.

The measured beam 22 impinges on a first beam receiver 24 which emits the measured signal B. The measured signal B passes through a first gate signal circuit 25 and goes, as gate signal filtered measurement signal D, to a first band pass filter 26 which emits a band pass filtered measured signal E. After passing through a first mixer 27, the down-mixed measured signal F goes to a first low-pass filter 28 which sends a low-pass filtered measured signal G to a first comparator 29.

Reference beam 23 is detected by a second beam receiver 30, which generates reference signal A, which, after passing through a second gate signal filter 31, is sent to a second band pass filter 32 as gate signal filtered reference signal H. Reference signal 1, band pass filtered after exiting second band pass filter 32, goes to a second mixer 33. Down-mixed reference signal J, exiting second mixer 33, goes, after low-pass filtering in a second low-pass filter 34, as low-pass filtered reference signal K to a second comparator 35.

The two gate signal filters 25, 31 receive a gate signal C generated by gate signal circuit 16. The two mixers 27, 33 receive an output signal 36 of second frequency divider 12. The two comparators 29, 35 output a first input signal L and a second input signal N to phase comparator 13.

Figure 2:
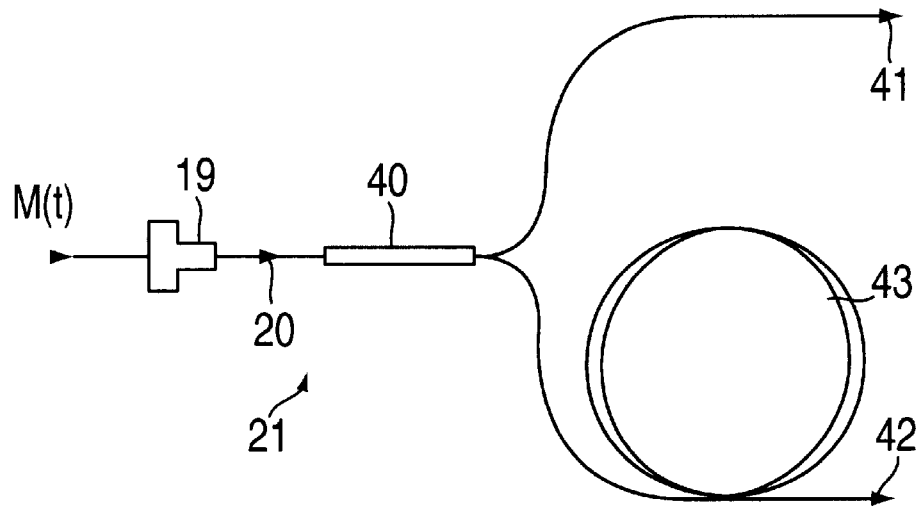
FIG. 2 shows part of an optical route.

FIG. 2 shows a portion of optical route 21 illustrated in FIG. 1. Optical beam 20 output by laser diode 19 goes, after passing through a beam splitter 40, as first optical beam 41 and second optical beam 42 to optical route 21, not shown in detail. Second optical beam 42 passes through an optical monostable element 43.

Figure 3:
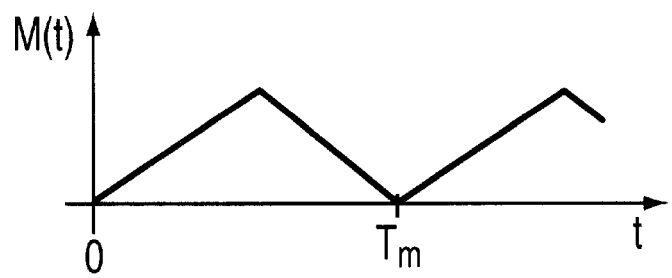
FIG. 3 shows a modulation signal.

FIG. 3 shows an example of modulation signal M(t) as a function of time t. An at least approximately triangular signal shape is shown with the period marked as $T_m$.

Figure 4:
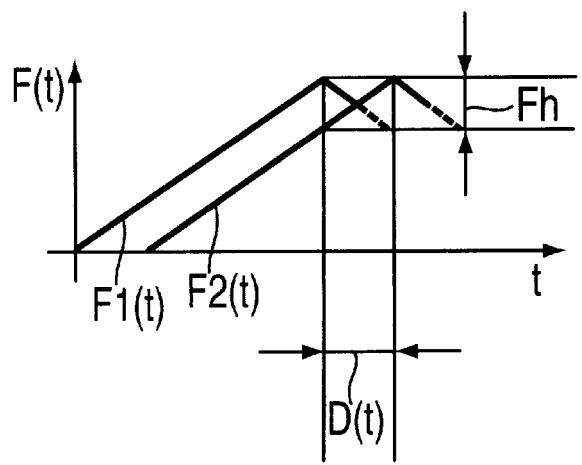
FIG. 4 shows a signal variation occurring in the optical route.

FIG. 4 shows the optical frequencies F(t) of the two optical beams 41, 42. F1(t) denotes the frequency of first optical beam 41 and F2(t) denotes the frequency of second optical beam 42. A frequency difference, denoted as heterodyne frequency Fh, occurs between the two frequencies F1(t) and F2(t) at any given time. After a time offset Dt, the two optical beams 41, 42 attain the same frequency.

Figure 5:
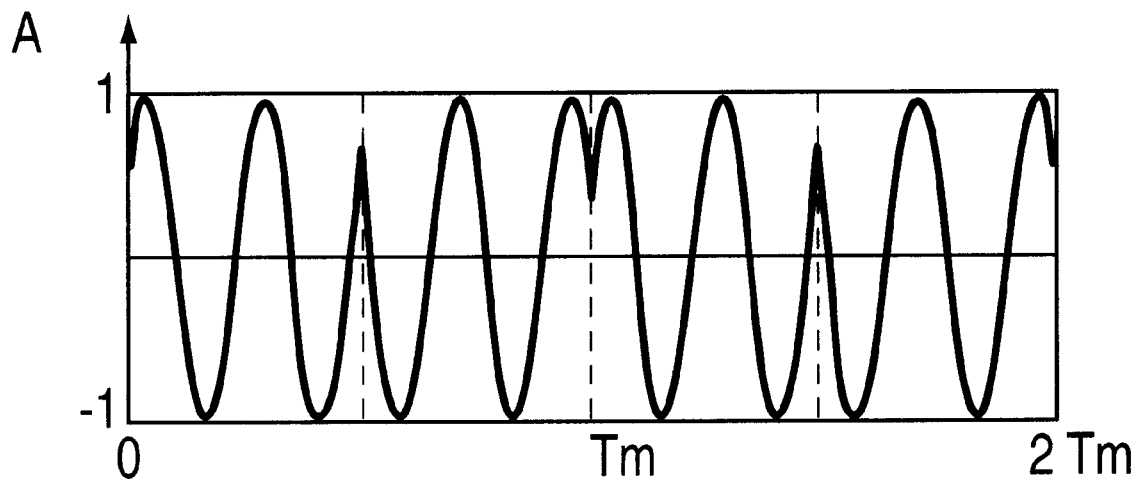
FIG. 5 shows a reference signal and a measured signal.
Figure 5:
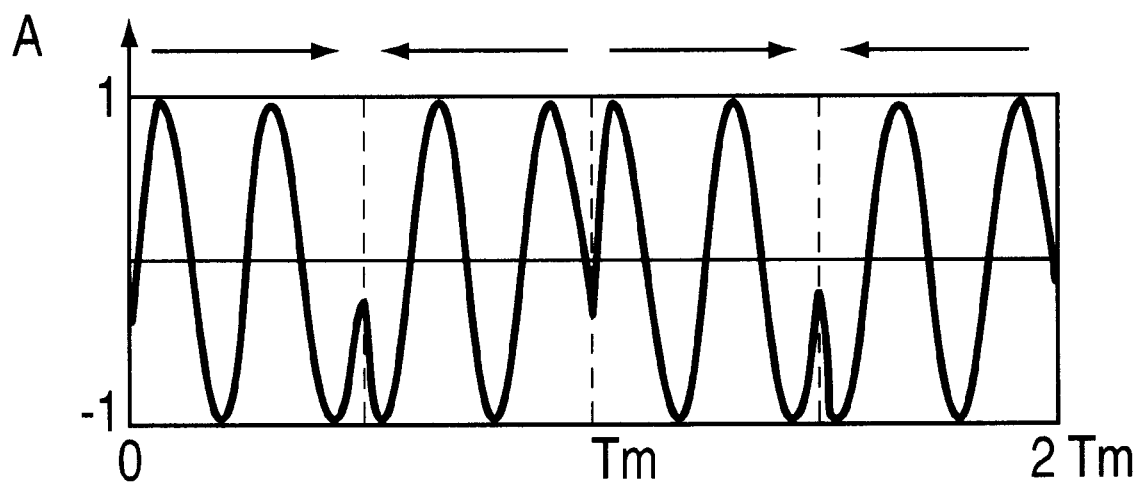

FIG. 5 shows reference signal A and measured signal B each as a function of time Tm.

Figure 6:
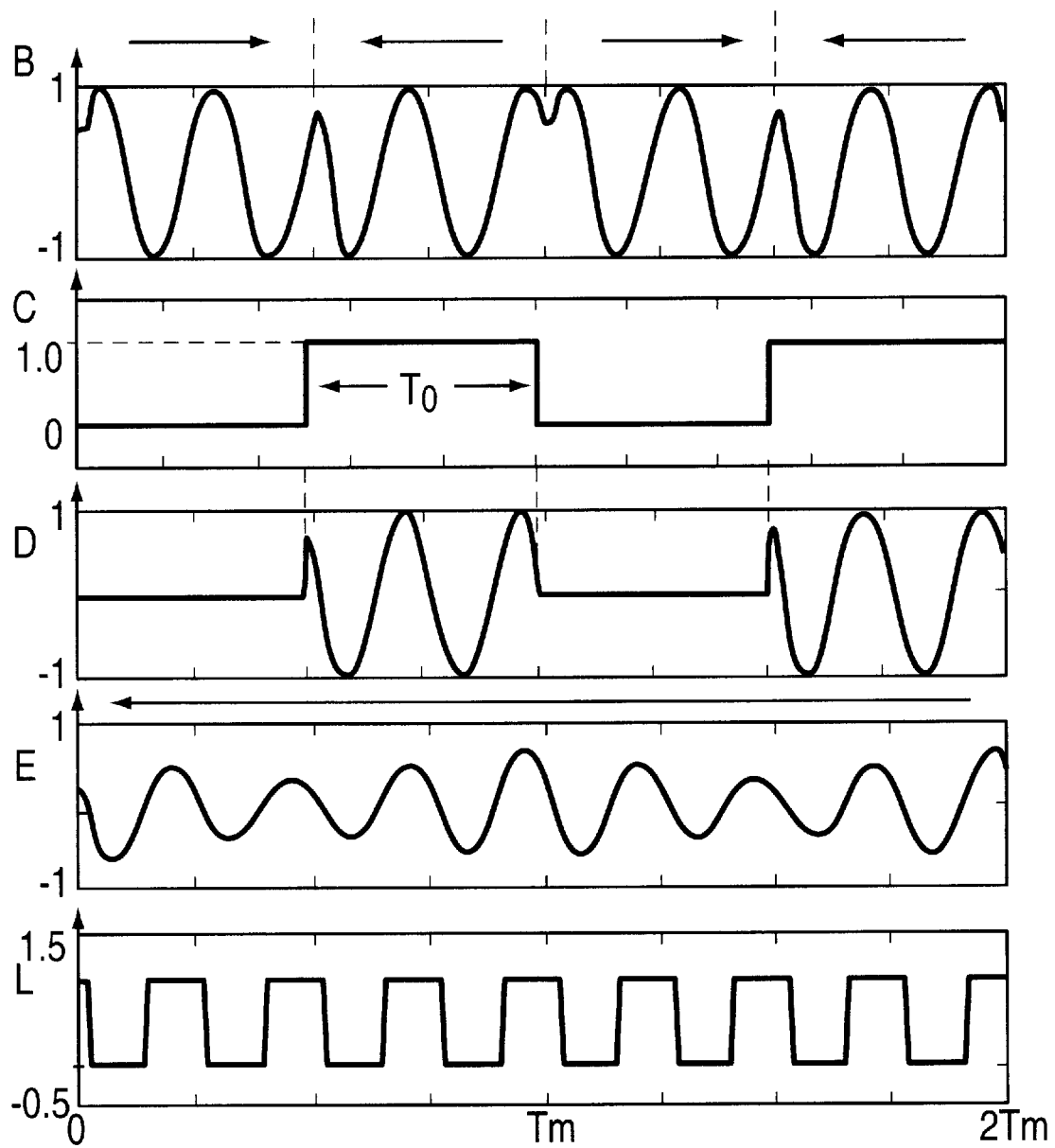
FIG. 6 shows signal variations occurring in the circuit according to FIG. 1.

FIG. 6 shows measured signal B, gate signal C, gate signal filtered measured signal D, band pass filtered measured signal E, and first input signal L each as a function of time Tm. Gate signal C has a window period To.

The circuit according to the present invention operates as follows:

The part of optical route 21 shown in FIG. 2 is part of a heterodyne interferometer, in which first optical beam 41 and second optical beam 42 travel through a reference route and a measured route and are brought to beam receivers 24, 30, respectively, for interference. The injection current of laser diode 19 is modulated using modulation signal M(t). A suitable modulation signal M(t) is shown in FIG. 3, according to which a triangular signal, for example, is appropriate. Instead of the triangular signal shown in FIG. 3, a saw tooth shaped signal can also be provided. The period of modulation signal M(t) is Tm. In addition to influencing the radiation power of laser diode 19, the frequency of optical beam 20 output by laser diode 19 is modified. From beam 20 generated by laser diode 19, beam splitter 40 produces first and second optical beams 41, 42. In contrast with first optical beam 41, second optical beam 42 has passed through optical monostable element 43. Optical monostable element 43 can be implemented, for example, as an optical bypass in air, in a glass fiber, or, for example, in a prism. Due to the periodic modulation, both optical beams 41, 42 have, at any time, a frequency difference, which is referred to as heterodyne frequency Fh.

Using FIG. 4 it is explained below how heterodyne frequency Fh is obtained. FIG. 4 shows optical frequencies F(t) as a function of time t. Optical monostable element 43 delays second optical beam 42 by a time offset Dt with respect to first optical beam 41. Assuming that the frequency of optical beam output by laser diode 19 is constantly changed by modulation signal M(t), at any time the same frequency difference, namely, heterodyne frequency Fh, occurs between the two optical beams 41, 42. The linear frequency rise and the suggested linear frequency drop shown in FIG. 4 is achieved through the triangular signal shape of modulation signal M(t) as shown in FIG. 3.

Optical route 21 contains, for example, a fixed reference route and a variable measured route. The measured route is changed by the motion of a measured object. The reference route is used for generating the reference phase. Each of the two beam receivers 24, 30 must receive both first and second optical beams 41, 42. Only then is it guaranteed that electric signals with heterodyne frequency Fh, instead of the optical signal frequency, which cannot be easily analyzed using electrical means, are to be analyzed.

Reference signal A and measured signal B, which are shown in FIG. 5 as a function of time, plotted in the measuring units of period Tm of modulation signal M(t), have a sinusoidal shape, with the essential information being contained in the phase angle.

If reference signal A is not available, the reference signal can also be obtained electrically from modulation signal M(t). Interference that affects optical route 21, such as a varying ambient temperature, can be taken into account through electric effects, if needed, in the electric implementation of reference signal A.

The signal processing circuit according to the present invention allows the phase difference between reference signal A shown in FIG. 5 and measured signal B to be determined. At any time, the two signals A, B have the phase difference to be determined. The prerequisite is that reference signal A and measured signal B have the same heterodyne frequency Fh and that the heterodyne frequency be established as an integer multiple of the modulation frequency. This can always be achieved by suitably dimensioning optical monostable element 43 and/or by appropriately establishing the amplitude of modulation signal M(t).

The two signals A, B suffer phase jumps at times Tm/2, which are caused by changes in the slope of modulation signal M(t). The phase jumps make it difficult to determine the phase difference. The circuit according to the present invention allows signal processing resulting in first and second input signals L, N, which can be processed by a conventional phase comparator. Since both signals A, B are processed in an identical manner, in the following only the processing of measured signal B will be described using block diagram shown in FIG. 1 and the signal curves as a function of time shown in FIG. 6.

Quartz oscillator 10 provides clock signal T, which has a frequency of a few MHz, for example, 32 MHz. All the other required signals are derived from clock signal T. First divider 10 divides clock signal T by 32, for example, so that the frequency of output signal 14 of first divider 11 is one MHz. The inverse of the frequency of output signal 14 of first divider 11 determines period Tm of modulation signal M(t) generated in modulator 15. Modulator 15 outputs output signal 15 to network 18, which generates modulation signal M(t). The distortion of the laser diode current, which can be specified by preferably linear network 18 makes it possible to compensate for non-linearities or, for example, thermal time constants of laser diode 19. Thus it can be achieved that heterodyne frequency Fh is constant over an extended period.

Measured beam 22, which is detected by first beam receiver 24, having heterodyne frequency Fh due to the interference of the two optical beams 41, 42, is detected by first beam receiver 24, processed and made available as measured signal B. Measured signal B is multiplied in first gate signal filter 25 by gate signal C and then output by gate signal filter 25 as gate signal filtered measured signal D. Gate signal C is shown in the second curve of FIG. 6. Gate signal C is obtained from output signal 14 of first divider 11. Gate signal C is a square signal having period Tm and window period To. FIG. 6 is based on a pulse duty factor of approximately 50%. Gate signal C is derived, for example, via monostable flip-flops from output signal 14 of first divider 11. Gate signal circuit 16 may contain two monostable flip-flops for this purpose. With the time constants of the two monostable flip-flops, the relative position of the resulting signal window and its relative duration To can be specified. Gate signal C eliminates those signal components from measured signal B that have the same phase sign at constant heterodyne frequency Fh. By accurately determining the window start and duration To of the window, gate signal C also contributes to suppressing interference signals, which may arise in laser diode 19 when the slope of modulation signal M(t) changes in actual use.

Gate signal filters 25, 31 can be implemented as analog switches with the switching function being initiated by gate signal C. From the electric point of view, gate signal filtering corresponds to multiplying measured signal B by gate signal C. The result is gate signal filtered measured signal D, which is shown in the third curve of FIG. 6. Gate signal filtered measured signal D only contains those components of measured signal B, which have the same phase sign.

First band pass filter 26 provided next, whose central frequency is tuned to heterodyne frequency Fh, leads to interpolation of gate signal filtered measured signal B. The gaps resulting from gate signal filtering are thus eliminated. After a limitation, which can be performed by a comparator, for example, first input signal L can be derived from band pass filtered measured signal E. Signal processing, however, can be simplified using first mixer 27 shown in FIG. 1. Band pass filtered measured signal E, whose fundamental frequency is heterodyne frequency Fh, is converted in first mixer 27 into down-mixed measured signal F. First mixer 27 receives output signal 36 of second divider 12, which has signal components with the frequency required for the mixer.

After passing through first low-pass filter 28, which essentially rids down-mixed measured signal F from undesirable mixed signal components and from noise, low-pass filtered measured signal G is converted into first input signal L in first comparator 29, which compares low-pass filtered measured signal G with a predefined threshold value. First input signal L is shown in curve 5 of FIG. 6, first input signal L being directly derived from band pass filtered measured signal E. Down-mixing in first mixer 27 would increase the period in comparison with first input signal L shown in FIG. 6.

Signal processing of reference signal A is fully identical to the above-described signal processing of measured signal B. Second input signal N is the result of the processing of reference signal A. Phase comparator 13, which is described in detail in the related art described above, for example, determines the phase difference that exists between the two input signals L, N. The phase difference is a measure of the distance or angle in optical route 21, whose change over time corresponds to a velocity or an angular velocity.

What is claimed is:

1. A signal processing circuit for a reference signal and a measured signal, the reference signal occurring in a heterodyne interferometer, the signal processing circuit comprising:

a modulator controlling a particular frequency of an optical beam using a modulation signal which has a predetermined modulation period, the optical beam being emitted by a radiation source;

a first arrangement deriving a gate signal from the modulation signal, the gate signal having a period which is equal to the modulation period;

a second arrangement receiving the reference signal and filtering the reference signal using the gate signal to generate a first filtered signal, the first filtered signal including first signal components, each of the first signal components having the same phase sign;

a third arrangement receiving the measured signal and filtering the measured signal using the gate signal to generate a second filtered signal, the second filtered signal including second signal components, each of the second signal components having the same phase sign; and a phase comparator receiving the first and second filtered signals, and determining a phase difference between the reference signal and the measured signal, wherein the reference signal has a particular heterodyne frequency, and the measured signal has the particular heterodyne frequency, and wherein the particular heterodyne frequency is an integer multiple of a modulation frequency of the modulation signal.

2. The signal processing circuit according to claim 1, further comprising:

a band pass filter receiving the first and filtered second signals, the band pass filter being tuned to the particular heterodyne frequency.

3. The signal processing circuit according to claim 2, further comprising:

a mixer receiving the first and second filtered signals for reducing the particular heterodyne frequency.

4. The signal processing circuit according to claim 2, further comprising:

a low pass filter receiving the first and second filtered signals.

5. The signal processing circuit according to claim 2, further comprising:

a plurality of comparators receiving the first and second filtered signals, and generating first and second output signals; and a phase comparator receiving the first output signal as a first input signal and the second output signal as a second input signal.

6. The signal processing circuit according to claim 1, wherein the radiation source includes a laser diode.

7. The signal processing circuit according to claim 6, wherein the laser diode generates a diode current, and further comprising:

a non-linear characteristic element distorting the diode current.

8. The signal processing circuit according to claim 1, further comprising:

a fourth arrangement deriving the reference signal from the modulation signal.

9. The signal processing circuit according to claim 1, wherein the gate signal forms a time window which has a predetermined duration.

10. The signal processing circuit according to claim 1, wherein the gate signal forms a time window which has a predetermined start time.

* * * * *